(12) United States Patent
Kim et al.

(10) Patent No.: US 8,855,814 B2
(45) Date of Patent: Oct. 7, 2014

(54) ROBOT AND CONTROL METHOD THEREOF

(75) Inventors: Myung Hee Kim, Suwon-si (KR); San Lim, Suwon-si (KR); Kyung Shik Roh, Seongnam-si (KR); Young Bo Shim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 473 days.

(21) Appl. No.: 13/332,771

(22) Filed: Dec. 21, 2011

(65) Prior Publication Data

US 2012/0173019 A1    Jul. 5, 2012

(30) Foreign Application Priority Data

Dec. 29, 2010 (KR) .................. 10-2010-0137558

(51) Int. Cl.
*B25J 15/10* (2006.01)

(52) U.S. Cl.
USPC ............ 700/245; 294/111; 294/106; 901/36; 901/907; 901/39

(58) Field of Classification Search
USPC .......... 700/245; 294/111, 907, 106, 104, 107; 901/36, 39, 907
See application file for complete search history.

(56) References Cited

U.S. PATENT DOCUMENTS

| 4,957,320 A * | 9/1990 | Ulrich ........................... 294/106 |
| 5,501,498 A * | 3/1996 | Ulrich ........................... 294/106 |
| 2005/0151722 A1* | 7/2005 | Meteyer ....................... 345/158 |

* cited by examiner

*Primary Examiner* — Ronnie Mancho
(74) *Attorney, Agent, or Firm* — Staas & Halsey LLP

(57) ABSTRACT

A robot and a control method thereof which execute grasp planning of hands of the robot separately from motion planning of arms of the robot so as to apply a result of the grasp planning of the hands of the robot to the motion planning of the arms of the robot, and thus more rapidly, naturally and stably grasp an object in a grasp manner suited to a desired working purpose and judge whether or not grasping is executable prior to the motion planning of the arms of the robot, thereby more stably grasping the object.

13 Claims, 11 Drawing Sheets

ROBOT AND CONTROL METHOD THEREOF

CROSS-REFERENCE TO RELATED APPLICATIONS

This application claims the benefit of Korean Patent Application No. 2010-0137558, filed on Dec. 29, 2010 in the Korean Intellectual Property Office, the disclosure of which is incorporated herein by reference.

BACKGROUND

1. Field

Embodiments relate to a robot which grasps an object according to grasp planning of robot hands to grasp the object, and a control method thereof.

2. Description of the Related Art

Recently, vigorous research and development of humanoid robots, which have an appearance similar to humans and coexist with humans in working and living spaces of humans, is underway.

Grasping of an object by a humanoid robot is one of representative fields requiring imitation of a human behavior system, and may be difficult due to limit of hands.

Methods of implementing optimum grasp planning to enhance efficiency and stability in grasping of various objects and to allow a robot hand to grasp an object have been continuously researched now.

Conventionally, grasp planning to move hands of a robot to grasp a target object and motion planning to move arms of the robot according to the grasp planning are not separated but are integrated.

Therefore, if the hand of the robot properly grasps a target point of an object only through plural grasp motions, when, after a part of the object is grasped by the hand of the robot, the next motion is not followed, grasping suited to a task is not achieved and thus the task may fail.

Further, motion planning and grasp planning are simultaneously executed, and thus a result of the grasping planning is not directly used in other motion planning, motion control or visual servoing.

Moreover, since a final desired pose is judged after all motion planning and grasping planning have been completed, a motion of the robot hand may fall into an infinite loop.

As described above, since it takes a long time to grasp an object in the optimal grasp manner and whether or not grasping of an object in a grasp manner suited to a desired working purpose is not confirmed, the conventional grasping method may fail to execute grasping in a manner suited to the desired working purpose, as needed, and, if possible, execute unnatural and unstable grasping.

SUMMARY

Therefore, it is an aspect of an embodiment to provide a robot which executes grasp planning of hands of the robot separately from motion planning of arms of the robot so as to apply a result of the grasp planning of the hands of the robot to the motion planning of the arms of the robot and thus more rapidly, naturally and stably grasps an object in a grasp manner suited to a desired working purpose, and a control method thereof.

Additional aspects of embodiments will be set forth in part in the description which follows and, in part, will be obvious from the description, or may be learned by practice of embodiments.

In accordance with an aspect of an embodiment, a robot includes a database unit to store a plurality of grasp motions of each of target objects, a grasp motion generation unit to generate a plurality of grasp motions corresponding to a grasp purpose by calculating grasp scores of the plurality of generated grasp motions based on positions of hands, a position of a target object and a position of an obstacle from among the plurality of grasp motions of each of the target objects stored in the database unit, and an arm path generation unit to generate paths of arms based on the plurality of grasp motions generated by the grasp motion generation unit, if the number of grasp motions, the calculated grasp scores of which are more than a reference score, from among the plurality of grasp motions generated by the grasp motion generation unit exceeds a predetermined number.

The robot may further include a grasp map generation unit to select grasp motions, the calculated grasp scores of which are below the reference score, from among the plurality of grasp motions generated by the grasp motion generation unit as target grasp motions, if the number of grasp motions, the calculated grasp scores of which are more than the reference score, from among the plurality of the generated grasp motions is less than the predetermined number, to generate grasp motions executable at a current position, to generate grasp motion paths from the generated grasp motions up to the target grasp motions, and to generate a grasp map having a grasp motion path having a low cost from among the generated grasp motion paths.

The grasp map generation unit may calculate cost of each grasp motion path using a cost function below, $$f = C1 * h + C2 * g$$

here, h may be a cost of a path up to the current grasp motion, g may be a cost up to the target grasp motion, and C1 and C2 may be constants.

The grasp map generation unit may generate grasp motions executable at a current position of a hand of the robot from among the plurality of grasp motions generated by the grasp motion generation unit, calculate grasp scores of the generated grasp motions, calculate costs of grasp motions in a predetermined number, the calculated grasp costs of which are high, using the cost function, generates a grasp motion path connecting grasp motions determined by the calculated costs, generate grasp motions executable at a random position if the target object is located at the random position, calculate grasp scores of the generated grasp motions, calculate costs of grasp motions in a predetermined number, the calculated grasp costs of which are high, using the cost function, and generate a grasp motion path connecting grasp motions determined by the calculated costs.

The arm path generation unit may generate the paths of the arms based on the grasp motion path in the grasp map.

The grasp motion generation unit may calculate the grasp scores of the generated grasp motions based on position information of the hands, environmental information and information of the target objects.

The grasp motion generation unit may calculate the grasp scores of the generated grasp motions using a grasp score function below, $$G(O,E,P) = eC1 Gqe C2 Gbe C3 Gee C4 Gre C5 Gd$$

here, e may be a natural logarithm value, C1, C2, C3 and C4 may be constants, i.e., weights, Gq(P) (force closure score) may be a function expressing a degree of firmly grasping an object by a robot hand, i.e., a constant determined by position information (P) of the robot hands, Gb(E,P) may be a function expressing a degree of comfortably grasping the object by the robot hand, i.e., a constant determined by the position information (P) of the robot hands and environmental information (E), Ge(O,E,P) (environment clearance score) may be a function expressing an approaching distance with a surrounding obstacle, i.e., a constant determined by information (O) of the target object, the position information (P) of the robot hands and the environmental information (E), Gr(P) may be a function expressing a degree of colliding or overlapping the robot hands with a relative distance between the robot hands, i.e., a function value determined by the position information (P) of the robot hands, and Gd(O,P) may be a function expressing a distance from the robot hand to the target object, i.e., a constant determined by the information (O) of the target object and the position information (P) of the robot hands.

In accordance with another aspect of an embodiment, a control method of a robot includes generating a plurality of grasp motions corresponding to a grasp purpose from among a plurality of grasp motions of each of target objects stored in a database unit based on positions of hands, a position of a target object and a position of an obstacle, calculating grasp scores of the generated grasp motions, generating paths of arms based on the generated grasp motions, if the number of grasp motions, the calculated grasp scores of which are more than a reference score, from among the plurality of grasp motions generated by the grasp motion generation unit exceeds a predetermined number, and controlling movement of the arms and grasping of the hands based on the generated grasp motions and the generated paths of the arms.

The calculation of the grasp scores of the generated grasp motions may be carried out based on position information of the hands, environmental information and information of the target objects.

The calculation of the grasp scores of the generated grasp motions may be carried out using a grasp score function below, $$G(O,E,P)=eC1GqeC2GbeC3GeeC4GreC5Gd$$

here, e may be a natural logarithm value, C1, C2, C3 and C4 may be constants, i.e., weights, Gq(P) (force closure score) may be a function expressing a degree of firmly grasping an object by a robot hand, i.e., a constant determined by position information (P) of the robot hands, Gb(E,P) may be a function expressing a degree of comfortably grasping the object by the robot hand, i.e., a constant determined by the position information (P) of the robot hands and environmental information (E), Ge(O,E,P) (environment clearance score) may be a function expressing an approaching distance with a surrounding obstacle, i.e., a constant determined by information (O) of the target object, the position information (P) of the robot hands and the environmental information (E), Gr(P) may be a function expressing a degree of colliding or overlapping the robot hands with a relative distance between the robot hands, i.e., a function value determined by the position information (P) of the robot hands, and Gd(O,P) may be a function expressing a distance from the robot hand to the target object, i.e., a constant determined by the information (O) of the target object and the position information (P) of the robot hands.

The control method may further include selecting grasp motions, the calculated grasp scores of which are below the reference score, from among the plurality of grasp motions generated by the grasp motion generation unit as target grasp motions, if the number of grasp motions, the calculated grasp scores of which are more than the reference score, from among the plurality of the generated grasp motions is less than the predetermined number, generating grasp motions executable at a current position, generating grasp motion paths from the generated grasp motions up to the target grasp motions, and generating a grasp map having a grasp motion path having a low cost from among the generated grasp motion paths.

The generation of the grasp map may include generating grasp motions executable at a current position of a hand of the robot from among the plurality of grasp motions generated by the grasp motion generation unit, calculating grasp scores of the generated grasp motions, calculating costs of grasp motions in a predetermined number, the calculated grasp costs of which are high, using the cost function, generating a grasp motion path connecting grasp motions determined by the calculated costs, generating grasp motions executable at a random position if the target object is located at the random position, calculating grasp scores of the generated grasp motions, calculating costs of grasp motions in a predetermined number, the calculated grasp costs of which are high, using the cost function, and generating a grasp motion path connecting grasp motions determined by the calculated costs.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
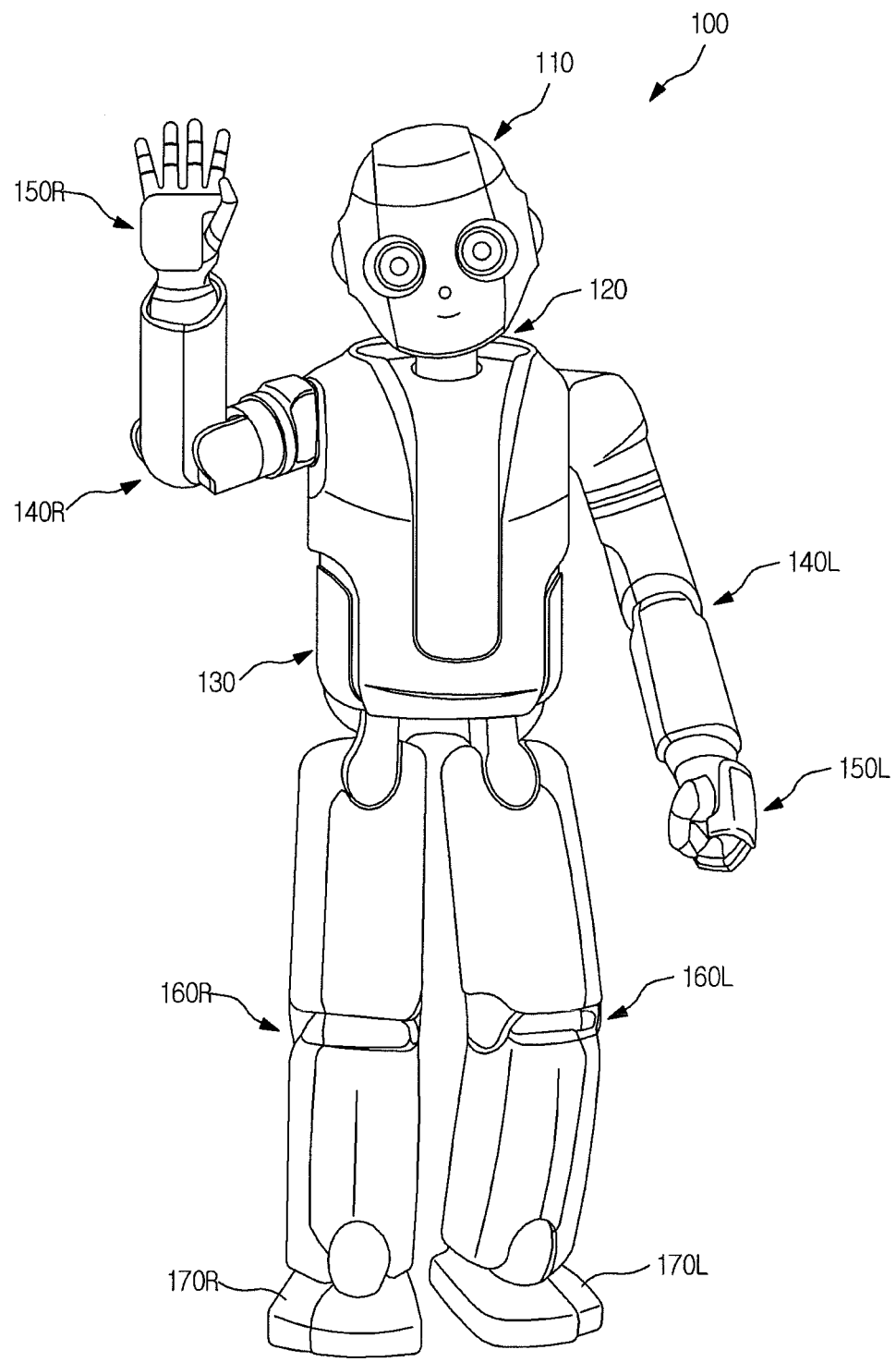
FIG. 1 is a perspective view exemplarily illustrating a robot in accordance with an embodiment.

Reference will now be made in detail to embodiments, examples of which are illustrated in the accompanying drawings, wherein like reference numerals refer to like elements throughout.

Figure 2:
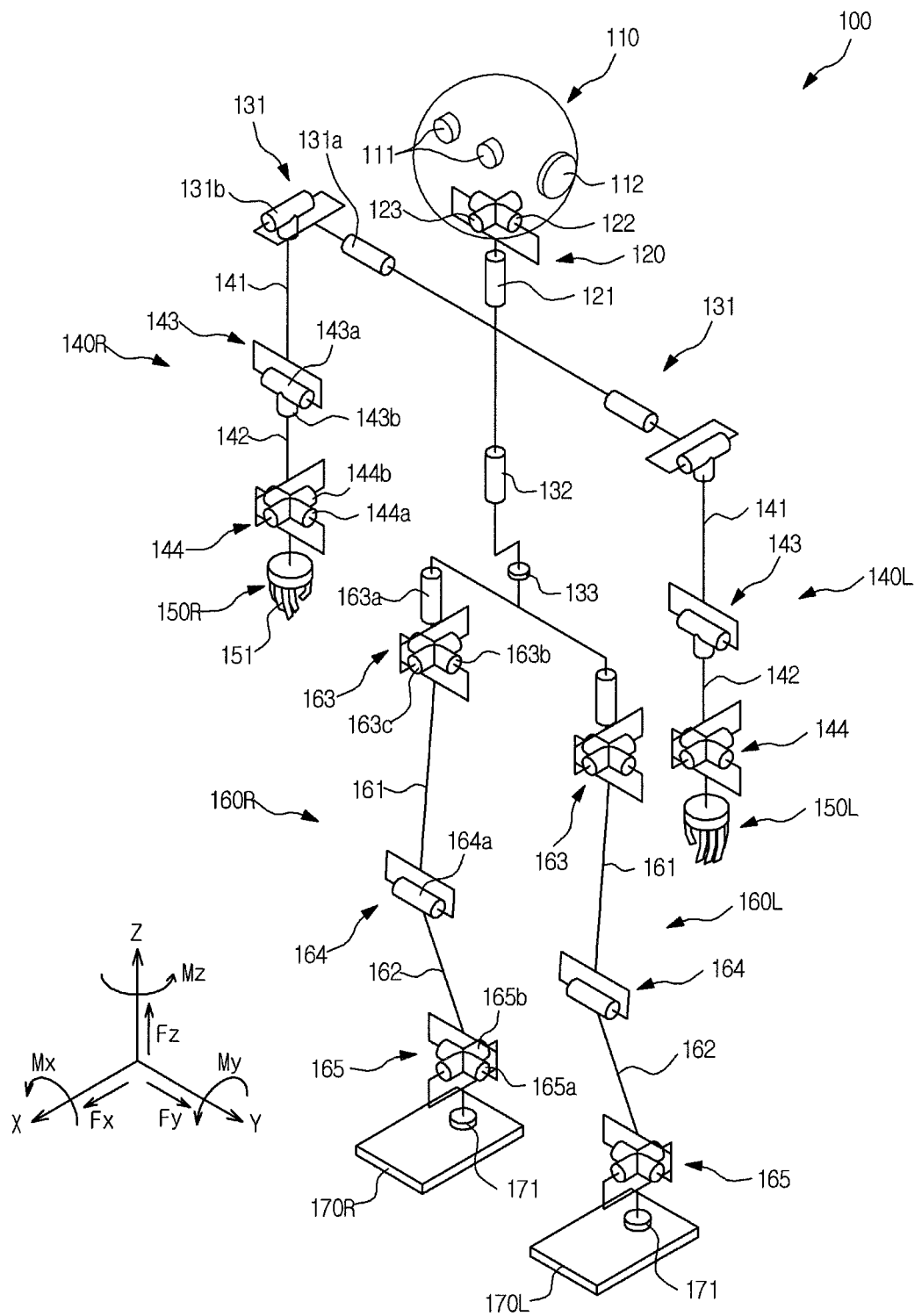
FIG. 2 is a schematic view exemplarily illustrating a joint structure of the robot in accordance with an embodiment.
Figure 3:
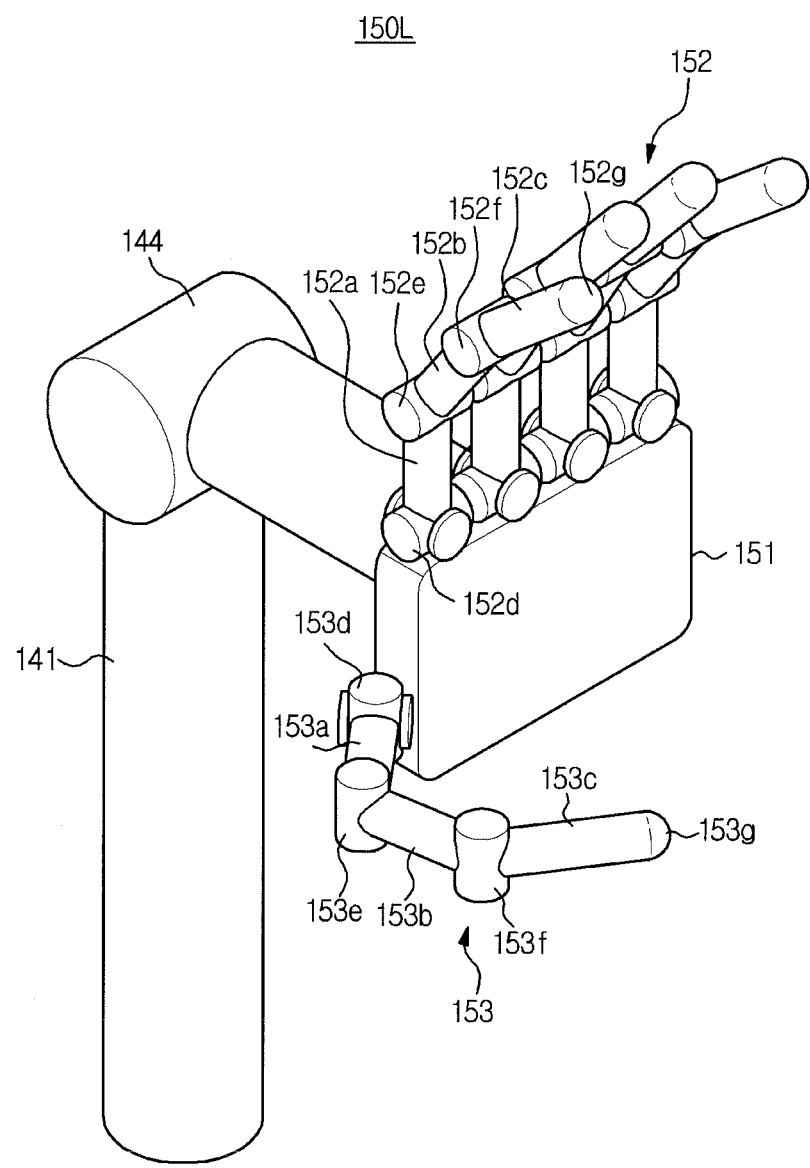
FIG. 3 is a schematic view exemplarily illustrating a hand of the robot in accordance with an embodiment.

FIG. 1 is a perspective view exemplarily illustrating a robot in accordance with an embodiment, FIG. 2 is a schematic view exemplarily illustrating a joint structure of the robot in accordance with an embodiment, and FIG. 3 is a schematic view exemplarily illustrating a hand of the robot in accordance with an embodiment.

As shown in FIG. 1, a robot 100 includes an upper body including a head 110, a neck 120, a torso 130, arms 140R and 140L and hands 150R and 150L, and a lower body including a plurality of legs 160R and 160L and feet 170R and 170L.

In more detail, the upper body of the robot 100 includes the head 110, the torso 130 connected to the lower portion of the head 110 through the neck 120, the two arms 140R and 140L connected to both sides of the upper portion of the torso 130, and the hands 150R and 150L respectively connected to tips of the two arms 140R and 140L.

The lower body of the robot 100 includes the two legs 160R and 160L connected to both sides of the lower portion of the torso 130 of the upper body, and the feet 170R and 170L respectively connected to tips of the two legs 160R and 160L.

Here, the head 110, the two arms 140R and 140L, the two hands 150R and 150L, the two legs 160R and 160L, and the two feet 170R and 170L respectively have designated degrees of freedom through joints.

Such upper and lower bodies of the robot 100 are protected by covers.

Here, "R" and "L" respectively indicate the right and left sides of the robot 100.

Hereinafter, with reference to FIG. 2, the robot 100 will be described in more detail.

Cameras 111 to capture surrounding images and microphones 112 to detect a user's voice are installed on the head 110.

The neck 120 connects the head 110 to the torso 130. Such a neck 120 includes a neck joint unit.

The neck joint unit includes a rotary joint 121 in the yaw direction (rotated around the Z-axis), a rotary joint 122 in the pitch direction (rotated around the Y-axis) and a rotary joint 123 in the roll direction (rotated around the X-axis), and thus has 3 degrees of freedom. Here, the rotary joints 121, 122 and 123 of the neck joint unit are respectively connected to head rotating motors (not shown).

Shoulder joint units 131 to connect the two arms 140R and 140L to the torso 130 are respectively provided at both sides of the torso 130, and each of the shoulder joint units 131 includes a rotary joint 131a in the pitch direction and a rotary joint 131b in the roll direction and thus has 2 degrees of freedom.

Further, a rotary joint unit 132 in the yaw direction to rotate the breast with respect to the waist is provided between the breast and the waist of the torso 130, and a tilt detection unit 133 to detect a tilt of the upper body of the robot 100 is further provided on the torso 130.

The tilt detection unit 133 detects tilts of the torso 130 with respect to the vertical line, i.e., rotational angles of three axes in the pitch, roll and yaw directions, and angular velocities thereof. Here, the tilt detection unit 133 may employ an inertial measurement unit to measure inertia.

Each of the two arms 140R and 140L includes an upper arm link 141, a lower arm link 142, an elbow joint unit 143, and a wrist joint unit 144.

Here, the upper arm links 141 of the two arms 140R and 140L are respectively connected to the torso 130 through the shoulder joint units 131 and are respectively connected to the lower arm links 142 through the elbow joint units 143. The lower arm links 142 are connected to the hands 150R and 150L through the wrist joint units 144.

Each elbow joint unit 143 includes a rotary joint 143a in the pitch direction and a rotary joint 143b in the yaw direction, and thus has 2 degrees of freedom. Each wrist joint unit 144 includes a rotary joint 144a in the pitch direction and a rotary joint 144b in the roll direction, and thus has 2 degrees of freedom.

Each hand 150R or 150L includes a palm 151 and five fingers 152 and 153. Each of the fingers 152 and 153 includes link members 152a, 152b, 152c or 153a, 153b, 153c and a plurality of joints 152d, 152e, 152f or 153d, 153e 153f driven by motors (not shown).

The hands 150R and 150L perform various motions, such as grasping of an object or pointing in a specific direction, in connection with movement of the arms 140R and 140L.

Each of the two legs 160R and 160L of the robot 100 respectively includes a thigh link 161, a calf link 162, a hip joint unit 163, a knee joint unit 164, and an ankle joint unit 165. A multi-axis force/torque sensor 171 is provided between each leg 160R or 160L and each foot 170R or 170L.

Hereinafter, with reference to FIG. 3, the hands 150R and 150L of the robot 100 will be described in more detail.

The right and left hands 150R and 150L of the robot 100 have the same structure, and thus only the left hand 150L of the robot 100 will be exemplarily described.

As shown in FIG. 3, the left hand 150L of the robot includes the palm 151 and the plural fingers 152 and 153 connected to the palm 151, and the palm 151 is connected to the arm 140L with at least 1 degree of freedom.

The plural fingers 152 and 153 include plural first fingers 152 extended from the edge of one end of the palm 151 in the same direction and bent in the direction of the palm 151, and at least one second finger 153 extended in a different direction from the first fingers 152 and bent in the direction of the palm 151.

The plural first fingers 152 respectively correspond to the index finger, the middle finger, the ring finger and the little finger of a human hand, and the at least one second finger 153 corresponds to the thumb of the human hand.

Each of the plural first fingers 152 includes the plural link members 152a, 152b and 152c and the plural joints 152d, 152e and 152f driven by the motors (not shown), and the second finger 153 includes the plural link members 153a, 153b and 153c and the plural joints 153d, 153e and 153f driven by the motors (not shown).

The plural link members 152a, 152b and 152c provided on each of the plural first fingers 152 are referred to as a first link member 152a, a second link member 152b and a third link member 152c in order of proximity to the palm 151, and the plural joints 152d, 152e and 152f provided on each of the plural first fingers 152 are referred to as a first joint 152d, a second joint 152e and a third joint 152f in order of proximity to the palm 151.

Here, the first joint 152d of the first finger 152 connects the palm 151 and the first link member 152a, the second joint 152e of the first finger 152 connects the first link member 152a and the second link member 152b, and the third joint 152f of the first finger 152 connects the second link member 152b and the third link member 152c.

The plural link members 153a, 153b and 153c provided on each of the at least one second finger 153 are referred to as a first link member 153a, a second link member 153b and a third link member 153c in order of proximity to the palm 151, and the plural joints 153d, 153e and 153f provided on each of the at least one second finger 153 are referred to as a first joint 153d, a second joint 153e and a third joint 153f in order of proximity to the palm 151.

Here, the first joint 153d of the second finger 153 connects the palm 151 and the first link member 153a, the second joint 153e of the second finger 153 connects the first link member 153a and the second link member 153b, and the third joint 153f of the second finger 153 connects the second link member 153b and the third link member 153c.

An encoder (not shown) to measure a joint angle 8 is installed at the tip of the third link member 152f of the first finger 152, i.e., the fingertip of the first finger 152 corresponding to the fingernail of a human hand, and an encoder (not shown) to measure a joint angle θ is installed at the tip of the third link member 153*f* of the second finger 153, i.e., the fingertip of the second finger 153 corresponding to the fingernail of the human hand.

Figure 4:
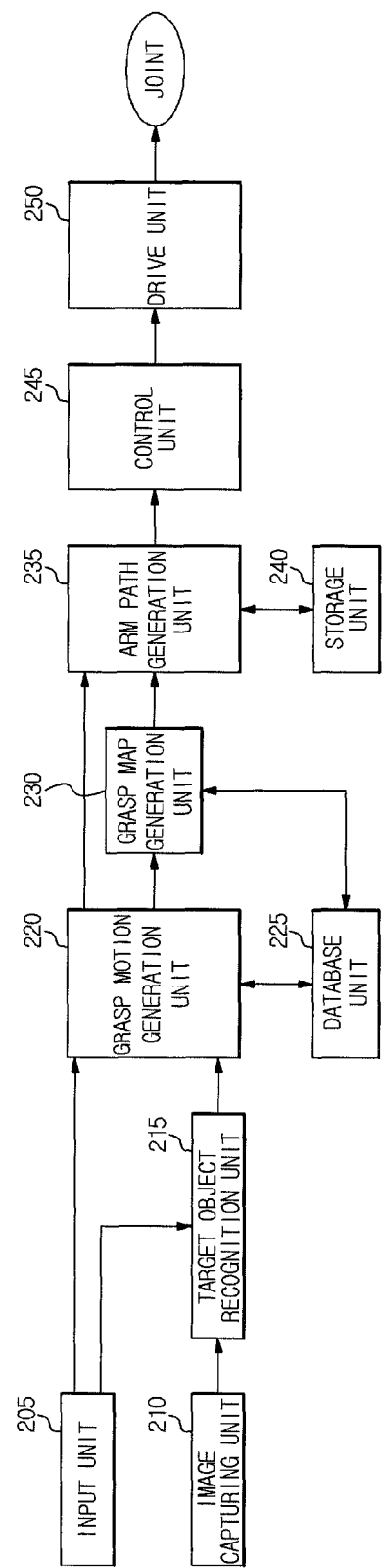
FIG. 4 is a block diagram illustrating grasping control of the robot in accordance with an embodiment.

FIG. 4 is a block diagram illustrating grasping control of the robot in accordance with an embodiment. The robot includes an input unit 205, an image capturing unit 210, a target object recognition unit 215, a grasp motion generation unit 220, a database unit 225, a grasp map generation unit 230, an arm path generation unit 235, a storage unit 240, a control unit 245, and a drive unit 250.

The input unit 205 receives information of a target object to be grasped input from a user. Here, the information of target objects include names of the target objects, hands to grasp the target objects, grasp purposes of the target objects, and target positions at which the target objects will be located.

The grasp purposes include working, moving and sticking, the target positions include a position at which a task will be executed using a target object if the grasp purpose is working, a position to which a target object will be moved if the grasp purpose is moving, and a position at which a target object will be stuck if the grasp purpose is sticking.

Further, as a hand to grasp a target object, a hand located adjacent to the target object based on the grasp purpose may be automatically determined.

Further, the input unit 205 may function as a communication unit to receive information of the target object transmitted from the outside.

The image capturing unit 210 captures an image around the target object using a device, such as the cameras 111 or a camcorder.

The target object recognition unit 215 removes noise from the captured image by filtering the image, performs pretreatment, recognizes the target object from the image based on information of the target object, confirms a position of the recognized target object, judges whether or not an obstacle is present around the target object, and confirms a position of the judged obstacle.

The grasp motion generation unit 220 judges whether or not the position of the obstacle is adjacent to the target object or whether or not collision of the target object with the obstacle during grasping of the target object is expected.

Further, the grasp motion generation unit 220 generates grasp motions satisfying end conditions representing a grasp pose, in which a grasp purpose of a current target object is executed, using information regarding plural grasp motions of each of the target objects stored in the database unit 225.

Further, the grasp motion generation unit 220 calculates grasp scores of the respective generated grasp motions using Equation 1 below.

$$G(O,E,P) = e^{C1Gq} e^{C2Gb} e^{C3Ge} e^{C4Gr} e^{C5Gd} \qquad \text{Equation 1}$$

Here, e is a natural logarithm value, C1, C2, C3 and C4 are constants, i.e., weights, Gq(P) (force closure score) is a function expressing a degree of firmly grasping an object by a robot hand, i.e., a constant determined by position information (P) of the robot hands, Gb(E,P) is a function expressing a degree of comfortably grasping the object by the robot hand, i.e., a constant determined by the position information (P) of the robot hands and environmental information (E), Ge(O,E, P) (environment clearance score) is a function expressing an approaching distance with a surrounding obstacle, i.e., a constant determined by information (O) of the target object, the position information (P) of the robot hands and the environmental information (E), Gr(P) is a function expressing a degree of colliding or overlapping the robot hands with a relative distance between the robot hands, i.e., a function value determined by the position information (P) of the robot hands, and Gd(O,P) is a function expressing a distance from the robot hand to the target object, i.e., a constant determined by the information (O) of the target object and the position information (P) of the robot hands.

Further, the grasp motion generation unit 220 aligns the grasp motions in descending order of calculated grasp score.

The information regarding the plural grasp motions of each of the target objects stored in the database unit 225 means information expressing the grasp motions of each of the target objects based on an object coordinate system. Here, the information regarding the plural grasp motions of each of the target objects is stored corresponding to grasp position and grasp direction of each of the target objects which are taken by the hands of the robot. For example, if the target object is a hammer, information regarding grasp motions of the hammer is stored in a type as shown in FIG. 5.

Figure 5:
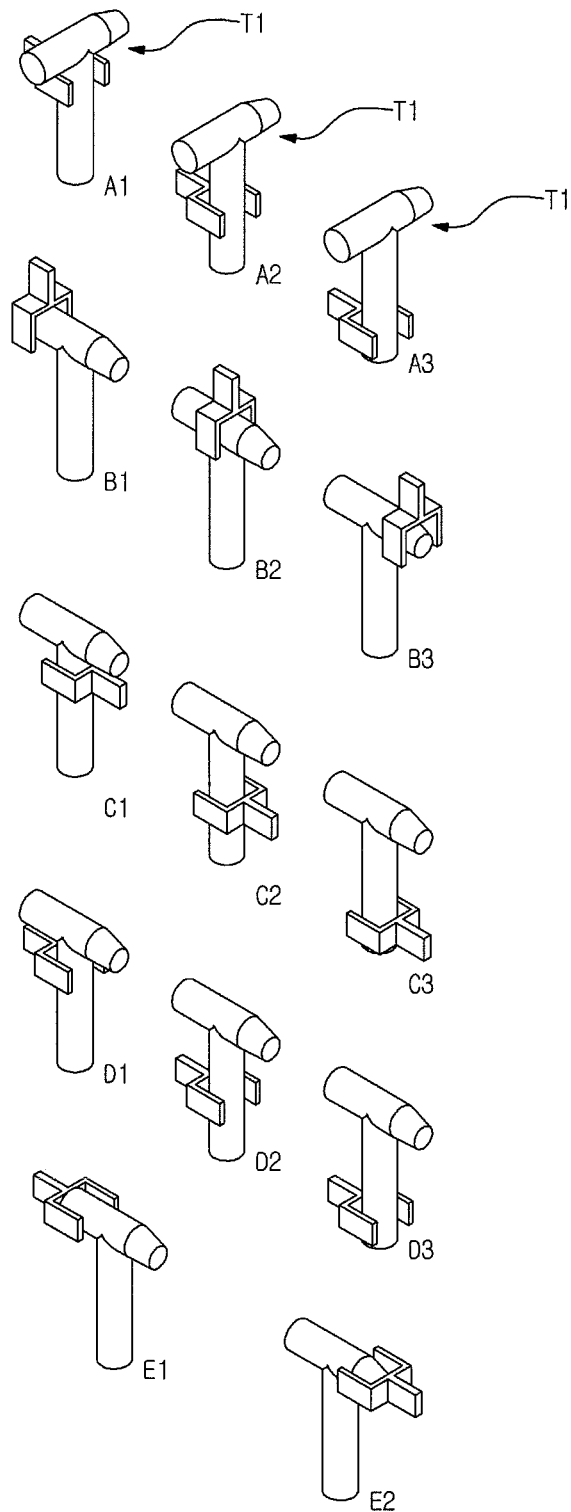
FIG. 5 is a view illustrating grasp motions stored in a database of the robot in accordance with an embodiment.

In the case of a hammer including a handle and a hitting member, as shown in FIG. 5, a graspable position of the hammer is one of the handle and the hitting member, grasp motions according to grasp positions and directions are stored, and codes are respectively assigned to the generated grasp motions. In more detail, plural grasp motions, in which the upper, middle and lower portions of the handle of the hammer T1 are grasped, or information to generate the grasp motions are stored, and plural different grasp motions A1, A2, A3, C1, C2, C3, D1, D2 and D3 according to relative directions of the hand to the hitting member during grasping or information to generate the plural different grasp motions A1, A2, A3, C1, C2, C3, D1, D2 and D3 are stored.

Further, plural grasp motions B1, B2 and B3, in which the left, middle and right portions of the hitting member of the hammer T1 are grasped, or information to generate the plural grasp motions B1, B2 and B3 are stored, and plural grasp motions E1 and E2, in which both side surfaces of the hitting member of the hammer T1 are grasped, or information to generate the plural grasp motions E1 and E2 are stored.

The grasp map generation unit 230 judges whether or not the grasp motions generated by the grasp motion generation unit 220 satisfy the end conditions, applies the generated grasp motions to a current position of a virtual robot hand upon judging that the generated grasp motions do not satisfy the end conditions, reads grasp motions which are executable at the current position of the robot hand from the database unit 225, respectively calculates grasp scores of grasp motions from among the read grasp motions except for grasp motions which are excluded due to an obstacle position, etc., and aligns the respective grasp motions in descending order of calculated grasp score. Further, the grasp map generation unit 230 respectively calculates costs of grasp motions in a predetermined number from among the aligned grasp motions using a cost function, selects grasp motions in a predetermined number, the calculated costs of which are low, and connects the selected grasp motions in a tree structure.

Thereafter, the grasp map generation unit 230 assumes that an object is present at a random position in a working space, reads grasp motions which are executable at such a position from the database unit 225, if he object is located at the random position, respectively calculates grasp scores of grasp motions from among the read grasp motions except for grasp motions which are excluded due to the obstacle position, etc., and aligns the respective grasp motions in descending order of calculated grasp score. Further, the grasp map generation unit 230 respectively calculates costs of grasp motions in a predetermined number from among the aligned grasp motions using a cost function, selects grasp motions in a predetermined number, the calculated costs of which are low, and connects the selected grasp motions in a tree structure.

The grasp map generation unit 230 generates a grasp map having a grasp motion path, in which an initial grasp motion is connected to a target grasp motion in a tree structure, through the above method.

The grasp map generation unit 230 calculates a cost of each grasp motion using a cost function (f) expressed by Equation 2 below.

$$f = C1*h + C2*g \qquad \text{Equation 2}$$

Here, h is a cost of a path up to the current grasp motion, g is a cost up to the target grasp motion, and C1 and C2 are constants. Further, h is Σ(distance differences from each grasp motion to the current grasp motion)+a grasp score G(O,E,P), and g is a distance from the current grasp motion to the target grasp motion+the grasp score G(O,E,P).

In the cost function (f) expressed by Equation 2 above, a cost-relating algorithm (for example, randomized A start search) in consideration of a distance up to the current point (current grasp motion) and a cost up to the target point (target grasp motion) is used.

The arm path generation unit 235 generates paths of the arms based on grasp motions, the grasp scores of which are more than a reference score, from among the grasp motions generated by the grasp motion generation unit 220 or the grasp map having the grasp motion path generated by the grasp map generation unit 230.

Here, the arm path generation unit 235 generates the paths of the arms in consideration of the inclination of the torso and the angles of the plural joints forming the shoulder joint units, the elbow joint units, the wrist joint units and the hands of the robot.

The arm path generation unit 235 may generate the paths of the arms using motion planning, such as a rapidly-exploring random tree (RRT) formed in order of grasp motion.

In the case of an RRT algorithm, random poses are formed through random calculation. Here, unnatural poses may be formed. Therefore, the paths of the arms are generated in advance offline, and then the paths of the arms are re-planned using current environmental information.

Here, the arm path generation unit 235 selects two grasp motions from among plural grasp motions generated offline, converts degrees of naturalness of joint angles of the arms, when the two grasp motions are simultaneously performed, into values, stores the values, and generates paths of the arms using the values. As such a value decreases, the joint angle of the arm becomes more natural.

Further, the paths of the arms may be stored in the database unit 225.

The storage unit 240 stores various data and programs related to grasp motion generation and grasp map generation.

The control unit 245 calculates torques to track the paths of the arms based on arm path information transmitted from the arm path generation unit 235, controls pulse width modulation (PWM) of the drive unit 250 based on the calculated torques, thereby causing the respective joints provided on the arms to move. Here, the torque is rotary force of a motor (not shown) to track a target angle.

In more detail, the control unit 245 calculates torques of the rotary joints 131a in the pitch direction and the rotary joints 131b in the roll direction of the shoulder joint units 131, calculates torques of the rotary joints 143a in the pitch direction and the rotary joints 143b in the yaw direction of the elbow joint units 143 and calculates torques of the rotary joints 144a in the pitch direction and the rotary joints 144b in the roll direction of the wrist joint units 144 based on the arm path information.

The control unit 245 calculates torques of the plural joints 152d, 152e, 152f, 153d, 153e and 153f of the respective hands 150R and 150L based on the grasp motion information and the arm path information.

The drive unit 250 outputs PWM signals to track the torques of the respective joints toward the respective joints provided on the arms under instructions of the control unit 245.

In more detail, the drive unit 250 drives the rotary joints 131a in the pitch direction and the rotary 131b joints in the roll direction of the shoulder joint units 131, drives the rotary joints 143a in the pitch direction and the rotary joints 143b in the yaw direction of the elbow joint units 143 and drives the rotary joints 144a in the pitch direction and the rotary joints 144b in the roll direction of the wrist joint units 144 based on the arm path information.

Figure 6:
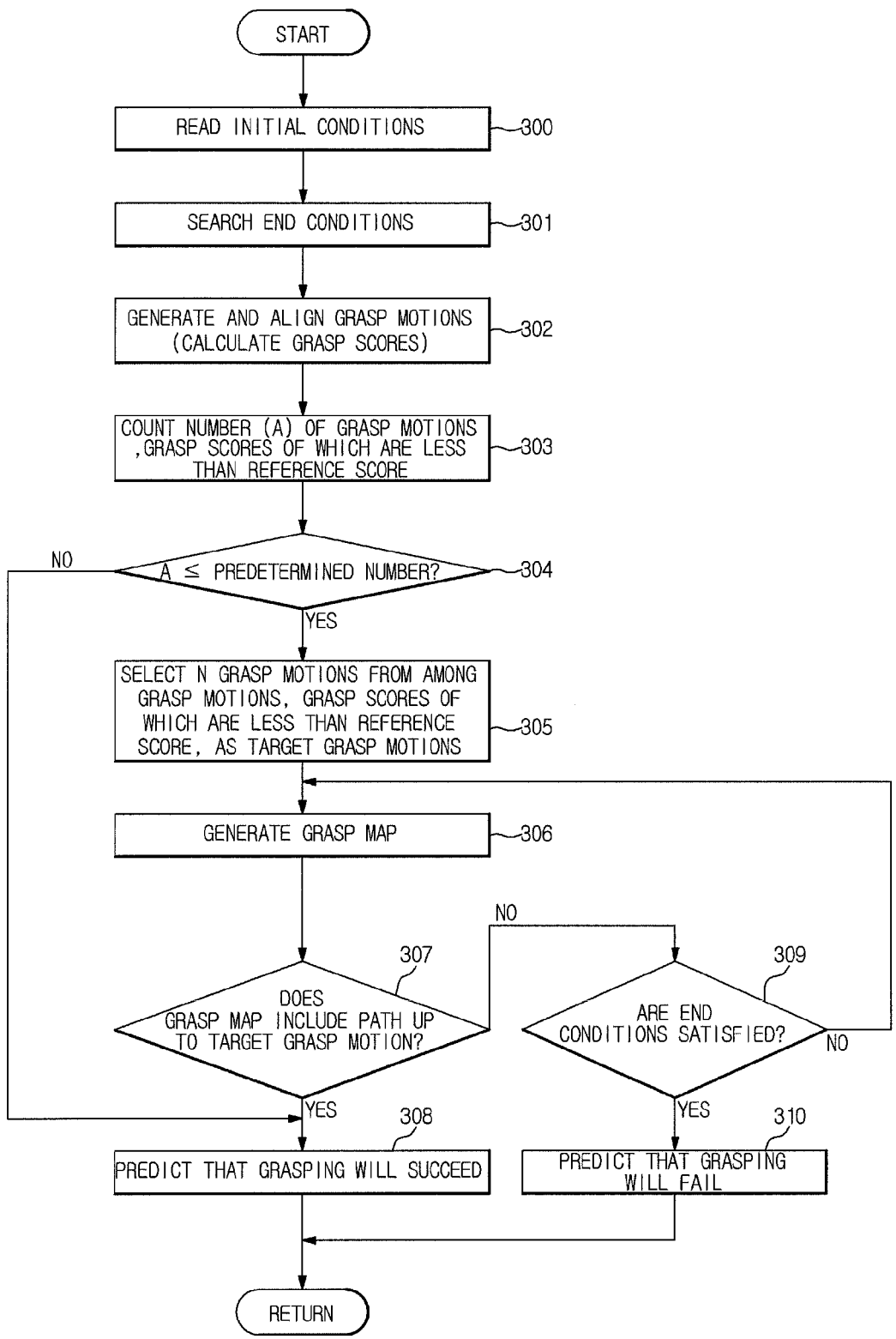
FIG. 6 is a flowchart illustrating a process of executing grasp planning in the robot in accordance with an embodiment.

FIG. 6 is a flowchart illustrating a process of executing grasp planning in the robot in accordance with an embodiment.

With reference to FIG. 6, the robot reads positions of the robot hands, positions of an object and an obstacle and initial conditions, such as grasp motion information of each of objects stored in the database unit 225 (Operation 300).

Then, the robot searches end conditions to execute a task so as to confirm a grasp purpose (Operation 301).

Thereafter, the robot generates grasp motions satisfying the end conditions based on the grasp motion information of each of the objects stored in the database unit 225, calculates grasp scores of the generated grasp motions, and aligns the grasp motions in descending order of calculated grasp score (Operation 302).

Figure 7:
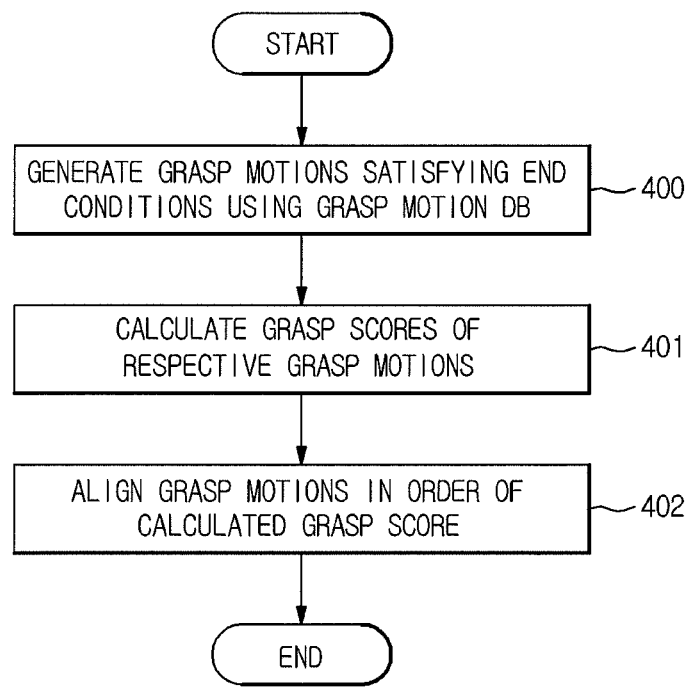
FIG. 7 is a flowchart illustrating generation and alignment of grasp motions in the robot in accordance with an embodiment.

As shown in FIG. 7, in Operation 302, the robot generates the grasp motions satisfying the end conditions based on the grasp motion information of each of the objects stored in the database unit 225 (Operation 400).

After generation of the grasp motions, the robot calculates the grasp scores of the generated grasp motions using Equation 1 above (Operation 401).

Thereafter, the robot aligns the grasp motions in descending order of calculated grasp score (Operation 402).

With reference to FIG. 6, after generation and alignment of the grasp motions, the robot counts the number of grasp motions, the grasp scores of which are less than a reference score (Operation 303).

After counting of the number of the grasp motions, the grasp scores of which are less than the reference score, the robot judges whether or not the counted number of the grasp motions is less than a predetermined number (Operation 304).

As a result of judgment in Operation 304, if the counted number of the grasp motions is less than the predetermined number, the robot selects n grasp motions from among the grasp motions, the grasp scores of which are less than the reference score, as target grasp motions (Operation 305). For example, the robot selects n grasp motions in descending order of grasp score from among the grasp motions, the grasp scores of which are less than the reference score, as the target grasp motions.

After selection of the n grasp motions in descending order of grasp score from among the grasp motions, the grasp scores of which are less than the reference score, as the target grasp motions, the robot calculates costs of grasp motion paths and generates a grasp map having a grasp motion path, the calculated cost of which is low (Operation 306).

Figure 8:
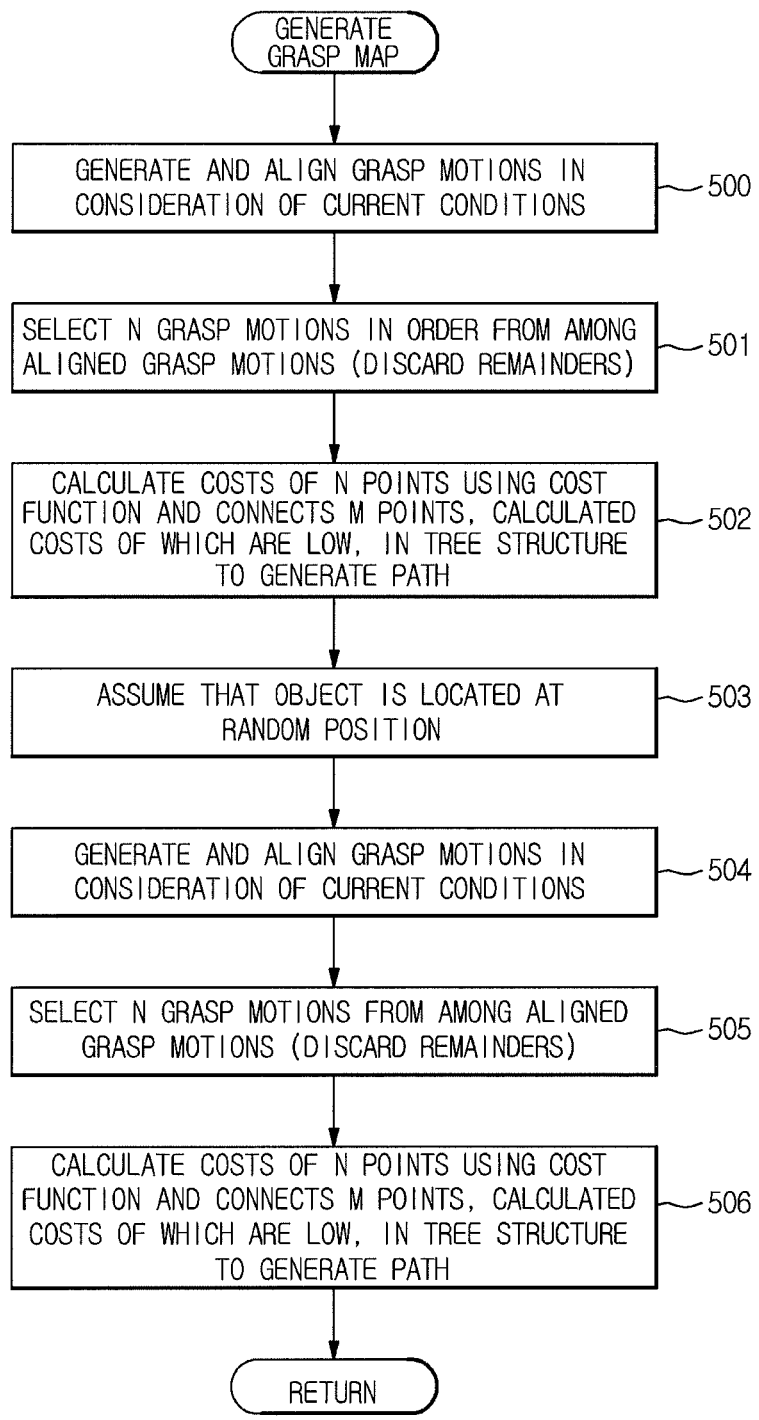
FIG. 8 is a flowchart illustrating generation of a grasp map in the robot in accordance with an embodiment.

As shown in FIG. 8, in Operation 306, the robot executes generation and alignment of grasp motions in consideration of current conditions (Operation 500), and selects n grasp motions in descending order of grasp score from among the aligned grasp motions (Operation 501). Here, the remaining grasp motions are discarded.

Figure 10:
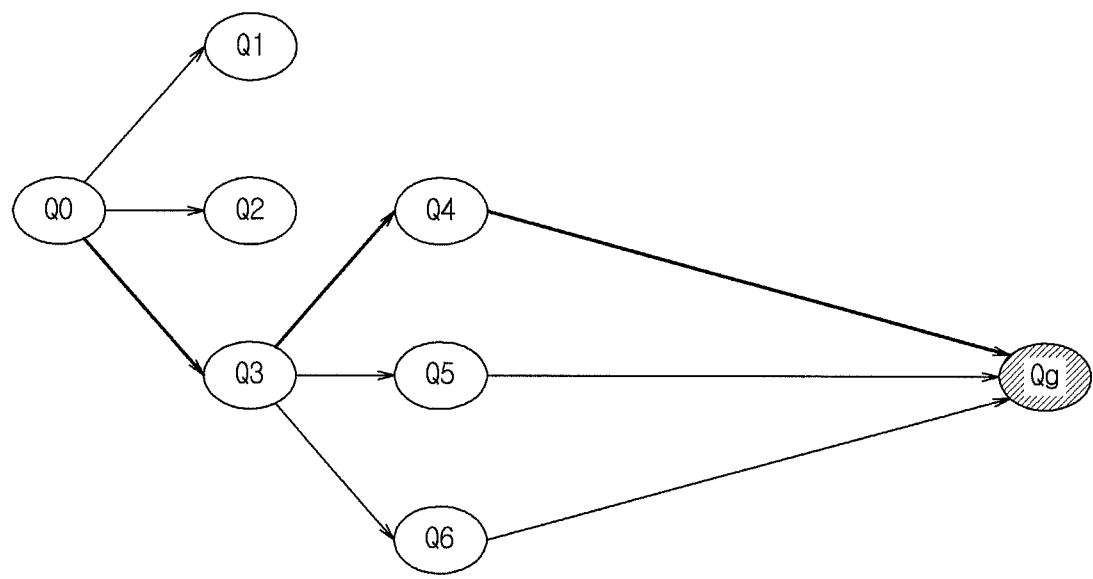
FIG. 10 is a view illustrating one example of generation of the grasp map in the robot in accordance with an embodiment.
Figure 11:
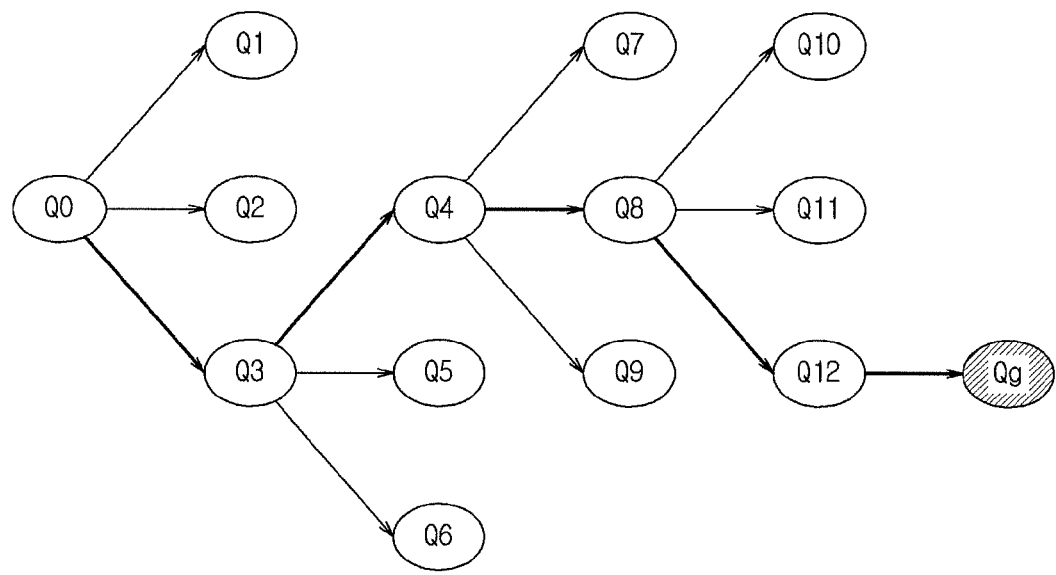
FIG. 11 is a view illustrating another example of generation of the grasp map in the robot in accordance with an embodiment.

The robot calculates costs of N points using the cost function, and then connects m points, the calculated costs of which are low, in a tree structure to generate a path (Operation 502; referring to bold lines of FIGS. 10 and 11). That is, FIG. 10 exemplarily illustrates a grasp motion path in which Q0, Q3, Q4 and Qg are sequentially connected, and FIG. 11 exemplarily illustrates a grasp motion path in which Q0, Q3, Q4, Q8, Q12 and Qg.

Thereafter, the robot assumes that an object is located at a random position (Operation 503), and executes generation and alignment of grasp motions in consideration of the current conditions under the above assumption (Operation 504).

Figure 9:
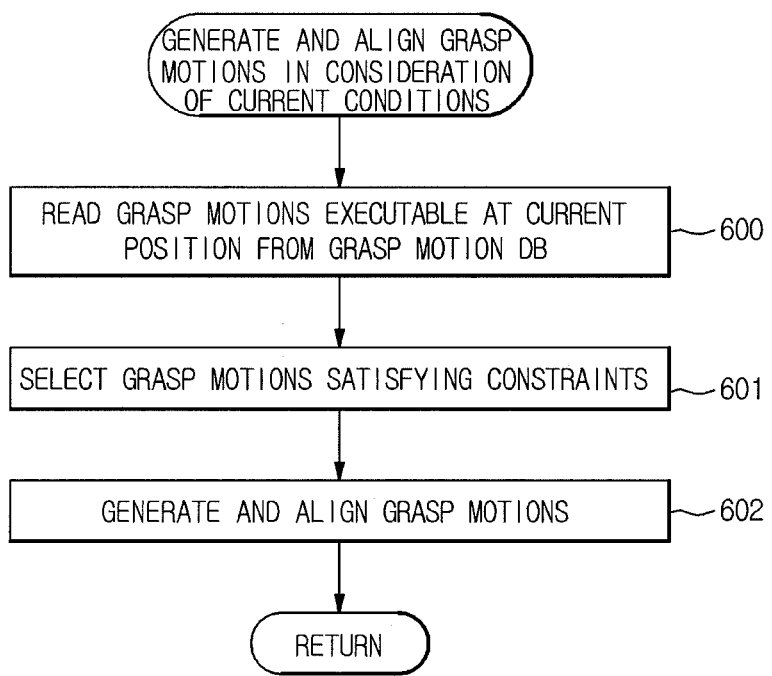
FIG. 9 is a flowchart illustrating generation and alignment of grasp motions in consideration of current conditions in the robot in accordance with an embodiment.

As shown in FIG. 9, in Operation 504, the robot reads grasp motions which are executable at the current position from the database unit 225 (Operation 600), selects grasp motions satisfying constraints from among the read grasp motions (Operation 601), and executes generation and alignment of grasp motions with respect to the selected grasp motions (Operation 602). Here, generation and alignment of the grasp motions includes respectively calculating grasp scores of the grasp motions and aligning the grasp motions in descending order of calculated grasp score.

With reference to FIG. 8, the robot selects n grasp motions in descending order of grasp score from among the aligned grasp motions (Operation 505). Here, the remaining grasp motions are discarded.

The robot calculates costs of N points using the cost function, and then connects m points, the calculated costs of which are low, in a tree structure to generate a path (Operation 506; referring to bold lines of FIGS. 10 and 11).

With reference to FIG. 6, after generation of the grasp map, the robot judges whether or not the generated grasp map includes a path up to a target grasp motion (Operation 307). As a result of judgment in Operation 307, if the generated grasp map includes the path up to the target grasp motion, the robot judges that grasping is executed under a desired condition and predicts that grasping will succeed (Operation 308).

On the other hand, as the result of judgment in Operation 307, if the generated grasp map does not include the path up to the target grasp motion, the robot judges whether or not the end conditions are satisfied (Operation 309). Upon judging that the end conditions are not satisfied, the robot returns to Operation 306 and thus generates a grasp map. On the other hand, upon judging that the end conditions are satisfied, the robot predicts that grasping will fail (Operation 310).

With reference to FIG. 6, as the result of judgment in Operation 304, if the counted number of the grasp motions exceeds the predetermined number, the robot predicts that grasping will succeed (Operation 308).

Thereafter, the robot generates paths of the arms based on the grasp map having the grasp motion path up to the target grasp motion or the grasp motions, the grasp scores of which exceed the reference score.

After generation of the paths of the arms, the robot calculates torques to track the paths of the arms based on the arm path information. In more detail, the robot calculates torques of the rotary joints 131a in the pitch direction and the rotary joints 131b in the roll direction of the shoulder joint units 131, calculates torques of the rotary joints 143a in the pitch direction and the rotary joints 143b in the yaw direction of the elbow joint units 143 and calculates torques of the rotary joints 144a in the pitch direction and the rotary joints 144b in the roll direction of the wrist joint units 144.

Further, the robot calculates torques of the plural joints 152d, 152e, 152f, 153d, 153e and 153f of the respective hands 150R and 150L based on the grasp motions, the grasp scores of which exceed the reference score, or the grasp map information.

Thereafter, the robot outputs PWM signals to track the torques of the respective joints toward the respective joints provided on the arms, thereby driving the rotary joints 131a in the pitch direction and the rotary 131b joints in the roll direction of the shoulder joint units 131, driving the rotary joints 143a in the pitch direction and the rotary joints 143b in the yaw direction of the elbow joint units 143 and driving the rotary joints 144a in the pitch direction and the rotary joints 144b in the roll direction of the wrist joint units 144.

Further, the robot drives the plural joints 152d, 152e, 152f, 153d, 153e and 153f of the respective hands 150R and 150L, thereby executing grasping.

As is apparent from the above description, a robot and a control method thereof in accordance with an embodiment execute grasp planning of hands of the robot separately from motion planning of arms of the robot and thus apply a result of the grasp planning of the hands of the robot to the motion planning of the arms of the robot, thereby more rapidly, naturally and stably grasping an object in a grasp manner suited to a desired working purpose.

Further, the robot and the control method thereof in accordance with an embodiment apply the result of the grasp planning of the hands of the robot to the motion planning of the arms of the robot, and thus reduce a total calculation time to increase calculation efficiency, minimize generation of paths of the arms and allow an arm path calculation process to be executed at the middle or late stage of a grasping control process, thereby improving grasp performance.

Moreover, the robot and the control method thereof in accordance with an embodiment allow the grasp planning of the hands of the robot to be executed prior to the motion planning of the arms of the robot, and thus judge whether or not grasping is executable prior to the motion planning of the arms of the robot, thereby more stably executing grasping.

The embodiments can be implemented in computing hardware and/or software, such as (in a non-limiting example) any computer that can store, retrieve, process and/or output data and/or communicate with other computers. For example, grasp motion generation unit 220, grasp map generation unit 230, arm path generation unit 235 and/or control unit 245 in FIG. 4 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A robot comprising:
   a database unit to store grasp motions of each of target objects;
   a grasp motion generation unit to generate grasp motions corresponding to a grasp purpose based on positions of hands of the robot, a position of a target object and a position of an obstacle from among the grasp motions of each of the target objects stored in the database unit, and to calculate grasp scores of the generated grasp motions; and
   an arm path generation unit to generate paths of arms of the robot based on the generated grasp motions, if a number of grasp motions, the calculated grasp scores of which are more than a reference score, from among the generated grasp motions exceeds a predetermined number.

2. The robot according to claim 1, further comprising a grasp map generation unit to select grasp motions, the calculated grasp scores of which are below the reference score, from among the generated grasp motions as target grasp motions, if the number of grasp motions, the calculated grasp scores of which are more than the reference score, from among the generated grasp motions is less than the predetermined number, to generate grasp motions executable at a current position, to generate grasp motion paths from the generated grasp motions executable at the current position up to the target grasp motions, and to generate a grasp map having a grasp motion path having a low cost from among the grasp motion paths generated from the generated grasp motions executable at the current position.

3. The robot according to claim 2, wherein the grasp map generation unit calculates cost of each grasp motion path using a cost function below, $$f = C1*h + C2*g$$

where h is a cost of a path up to a current grasp motion, g is a cost up to a target grasp motion, and C1 and C2 are constants.

4. The robot according to claim 3, wherein the grasp map generation unit generates grasp motions executable at a current position of a hand of the robot from among the generated grasp motions, calculates grasp scores of the generated grasp motions, calculates costs of grasp motions in a predetermined number, the calculated grasp costs of which are high, using the cost function, generates a grasp motion path connecting grasp motions determined by the calculated costs, generates grasp motions executable at a random position if the target object is located at the random position, calculates grasp scores of the generated grasp motions executable at the random position, calculates costs of grasp motions executable at the random position in a predetermined number, the calculated grasp costs of which are high, using the cost function, and generates a grasp motion path connecting grasp motions determined by the calculated costs of the grasp motions executable at the random position.

5. The robot according to claim 2, wherein the arm path generation unit generates the paths of the arms based on the grasp motion path in the grasp map.

6. The robot according to claim 1, wherein the grasp motion generation unit calculates the grasp scores of the generated grasp motions based on position information of the hands, environmental information and information of the target objects.

7. The robot according to claim 6, wherein the grasp motion generation unit calculates the grasp scores of the generated grasp motions using a grasp score function below, $$G(O,E,P) = eC1GqeC2GbeC3GeeC4GreC5Gd$$

where e is a natural logarithm value, C1, C2, C3 and C4 are constants, i.e., weights, Gq(P) (force closure score) is a function expressing a degree of firmly grasping an object by a robot hand, i.e., a constant determined by position information (P) of the robot hands, Gb(E,P) is a function expressing a degree of comfortably grasping the object by the robot hand, i.e., a constant determined by the position information (P) of the robot hands and environmental information (E), Ge(O,E,P) (environment clearance score) is a function expressing an approaching distance with a surrounding obstacle, i.e., a constant determined by information (O) of the target object, the position information (P) of the robot hands and the environmental information (E), Gr(P) is a function expressing a degree of colliding or overlapping the robot hands with a relative distance between the robot hands, i.e., a function value determined by the position information (P) of the robot hands, and Gd(O,P) is a function expressing a distance from the robot hand to the target object, i.e., a constant determined by the information (O) of the target object and the position information (P) of the robot hands.

8. A control method of a robot comprising:
   generating grasp motions corresponding to a grasp purpose from among stored grasp motions of each of target objects based on positions of hands of the robot, a position of a target object and a position of an obstacle;
   calculating grasp scores of the generated grasp motions;
   generating paths of arms of the robot based on the generated grasp motions, if a number of grasp motions, the calculated grasp scores of which are more than a reference score, from among the generated grasp motions exceeds a predetermined number; and
   controlling movement of the arms and grasping of the hands based on the generated grasp motions and the generated paths of the arms.

9. The control method according to claim 8, wherein the calculation of the grasp scores of the generated grasp motions is carried out based on position information of the hands, environmental information and information of the target objects.

10. The control method according to claim 9, wherein the calculation of the grasp scores of the generated grasp motions is carried out using a grasp score function below, $$G(O,E,P) = eC1GqeC2GbeC3GeeC4GreC5Gd$$

where e is a natural logarithm value, C1, C2, C3 and C4 are constants, i.e., weights, Gq(P) (force closure score) is a function expressing a degree of firmly grasping an object by a robot hand, i.e., a constant determined by position information (P) of the robot hands, Gb(E,P) is a function expressing a degree of comfortably grasping the object by the robot hand, i.e., a constant determined by the position information (P) of the robot hands and environmental information (E), Ge(O,E,P) (environment clearance score) is a function expressing an approaching distance with a surrounding obstacle, i.e., a constant determined by information (O) of the target object, the position information (P) of the robot hands and the environmental information (E), Gr(P) is a function expressing a degree of colliding or overlapping the robot hands with a relative distance between the robot hands, i.e., a function value determined by the position information (P) of the robot hands, and Gd(O,P) is a function expressing a distance from the robot hand to the target object, i.e., a constant determined by the information (O) of the target object and the position information (P) of the robot hands.

11. The control method according to claim 8, further comprising selecting grasp motions, the calculated grasp scores of which are below the reference score, from among the generated grasp motions as target grasp motions, if the number of grasp motions, the calculated grasp scores of which are more than the reference score, from among the generated grasp motions is less than the predetermined number, generating grasp motions executable at a current position, generating grasp motion paths from the generated grasp motions executable at the current position up to the target grasp motions, and generating a grasp map having a grasp motion path having a low cost from among the grasp motion paths generated from the generated grasp motions executable at the current position.

12. The control method according to 11, wherein the generation of the grasp map includes generating grasp motions executable at a current position of a hand of the robot from among the generated grasp motions, calculating grasp scores of the generated grasp motions executable at the current position, calculating costs of grasp motions executable at the current position in a predetermined number, the calculated grasp costs of which are high, using a cost function, generating a grasp motion path connecting grasp motions determined by the calculated costs, generating grasp motions executable at a random position if the target object is located at the random position, calculating grasp scores of the generated grasp motions executable at the random position, calculating costs of grasp motions executable at the random position in a predetermined number, the calculated grasp costs of which are high, using the cost function, and generating a grasp motion path connecting grasp motions determined by the calculated costs of grasp motions executable at the random position.

13. The control method according to claim 11, wherein the generation of the paths of the arms is carried out based on the grasp motion path in the grasp map.

\* \* \* \* \*

UNITED STATES PATENT AND TRADEMARK OFFICE
CERTIFICATE OF CORRECTION

PATENT NO. : 8,855,814 B2
APPLICATION NO. : 13/332771
DATED : October 7, 2014
INVENTOR(S) : Myung Hee Kim et al.

It is certified that error appears in the above-identified patent and that said Letters Patent is hereby corrected as shown below:

In the Claims

Column 15, line 18, in Claim 12, delete "to 11," and insert -- to claim 11, --, therefor.

Signed and Sealed this
Nineteenth Day of May, 2015

Michelle K. Lee
*Director of the United States Patent and Trademark Office*